United States Patent [19]

Narayan et al.

[11] Patent Number: 6,008,853
[45] Date of Patent: Dec. 28, 1999

[54] SUB-FRAME DECODER WITH AREA DEPENDENT UPDATE RATE FOR DIGITAL CAMCORDER TRANSMISSION STANDARD

[75] Inventors: Ajai Narayan, Dallas, Tex.; Manoj Aggarwal, Champaign, Ill.; Bruce E. Flinchbaugh, Dallas, Tex.

[73] Assignee: Texas Instruments Incorporated, Dallas, Tex.

[21] Appl. No.: 08/967,559

[22] Filed: Nov. 12, 1997

Related U.S. Application Data

[60] Provisional application No. 60/030,995, Nov. 15, 1996.

[51] Int. Cl.$^6$ ............................................. H04N 7/26
[52] U.S. Cl. ........................... 348/420; 348/390; 348/845
[58] Field of Search ................................. 348/420, 421, 348/390, 384, 845; H04N 7/26

[56] References Cited

U.S. PATENT DOCUMENTS

| | | | |
|---|---|---|---|
| 4,222,076 | 9/1980 | Knowlton | 348/384 |
| 5,150,432 | 9/1992 | Ueno | 348/438 |
| 5,508,743 | 4/1996 | Iizuka | 348/420 |
| 5,614,952 | 3/1997 | Boyce | 348/392 |
| 5,907,361 | 5/1999 | Okada | 348/399 |
| 5,930,526 | 7/1999 | Iverson | 348/385 |
| 5,951,140 | 8/1990 | Ueno | 348/413 |

*Primary Examiner*—Howard Britton
*Attorney, Agent, or Firm*—Robert D. Marshall, Jr.; Gerald E. Laws; Richard L. Donaldson

[57] ABSTRACT

This invention is a method of decoding a stream of video image data transmitted as independent image frames consisting of plural marcoblocks transmitted in a nonsequential order. The method defines a sub-frame corresponding to a proper subset of the full frame. The method determines if a currently received macroblock is within the sub-frame. The method decodes the sub-frame. The sub-frame may be decoded at less than or equal to the frame rate of the video image data. A table has one entry for each macroblock that stores a transmission order within the video frame for the corresponding macroblock. The method determine if a current macroblock is within the sub-frame by reading the table. Each macroblock consists of a plurality of contiguous blocks and includes luminance data for any included blocks and chrominance data for the macroblock as a whole. The method optionally decodes the luminance data for each included block and ignores the chrominance data. The method decodes the sub-frame employing only data prior to an end of data marker or the end of a data group allocated to that block, and ignores data following an end of data marker. The method may also decode a full frame of video image data at a full frame decode rate less than the sub-frame decode rate. The method preferably employs a digital camcorder to generate the stream of video image data and a notebook computer for decoding and display.

30 Claims, 3 Drawing Sheets

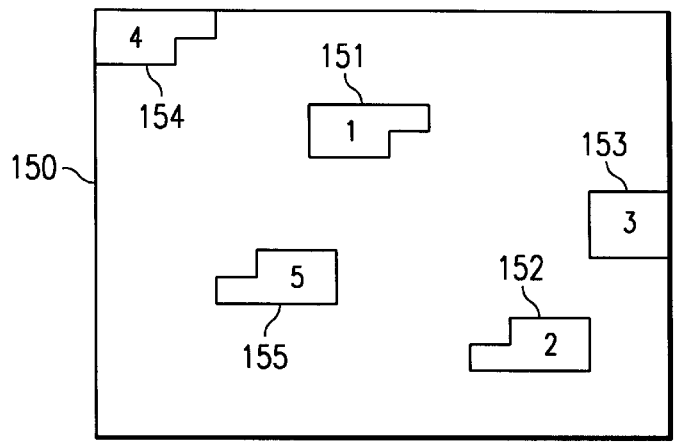
FIG. 3
FIG. 4
(PRIOR ART)
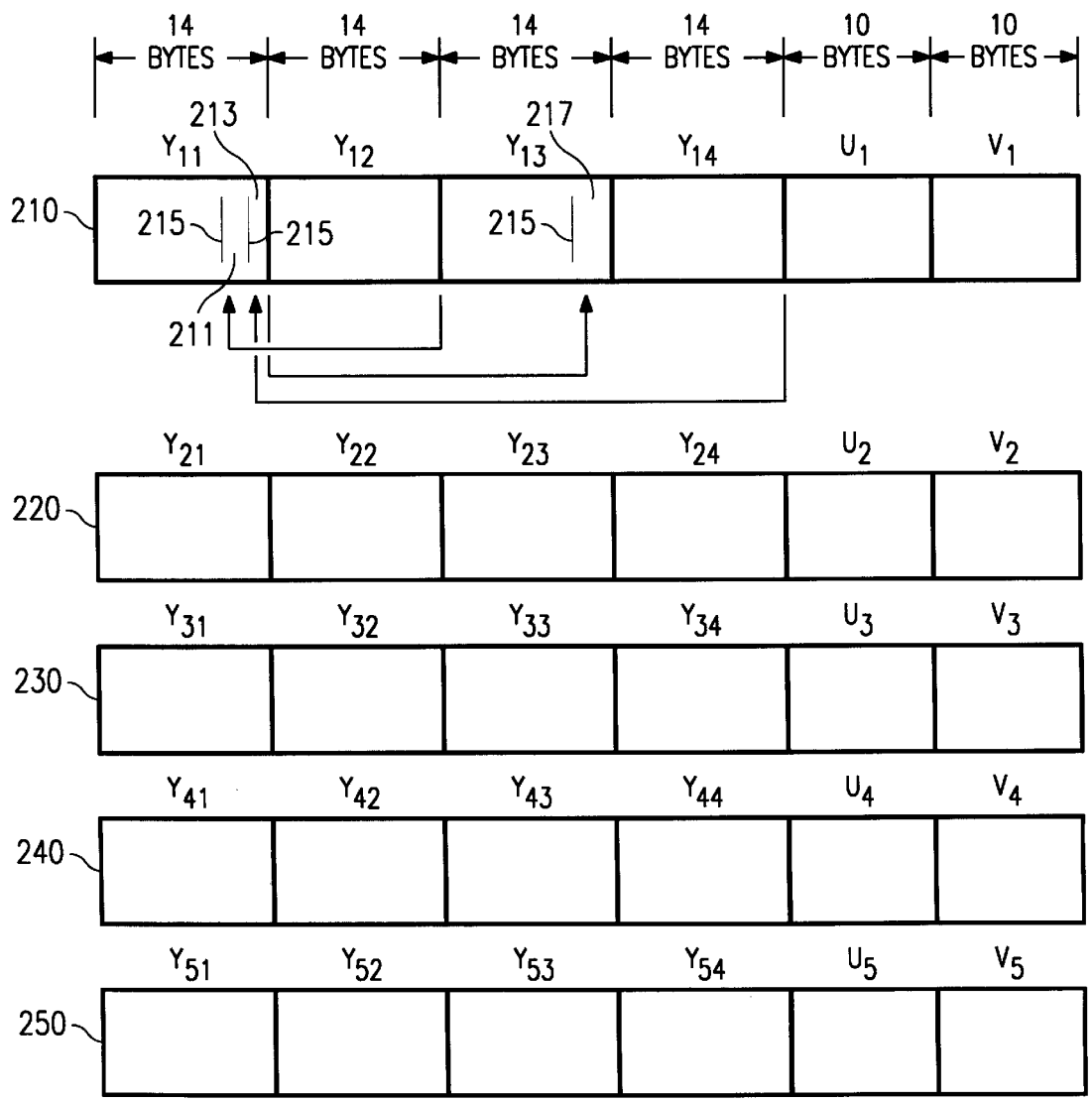

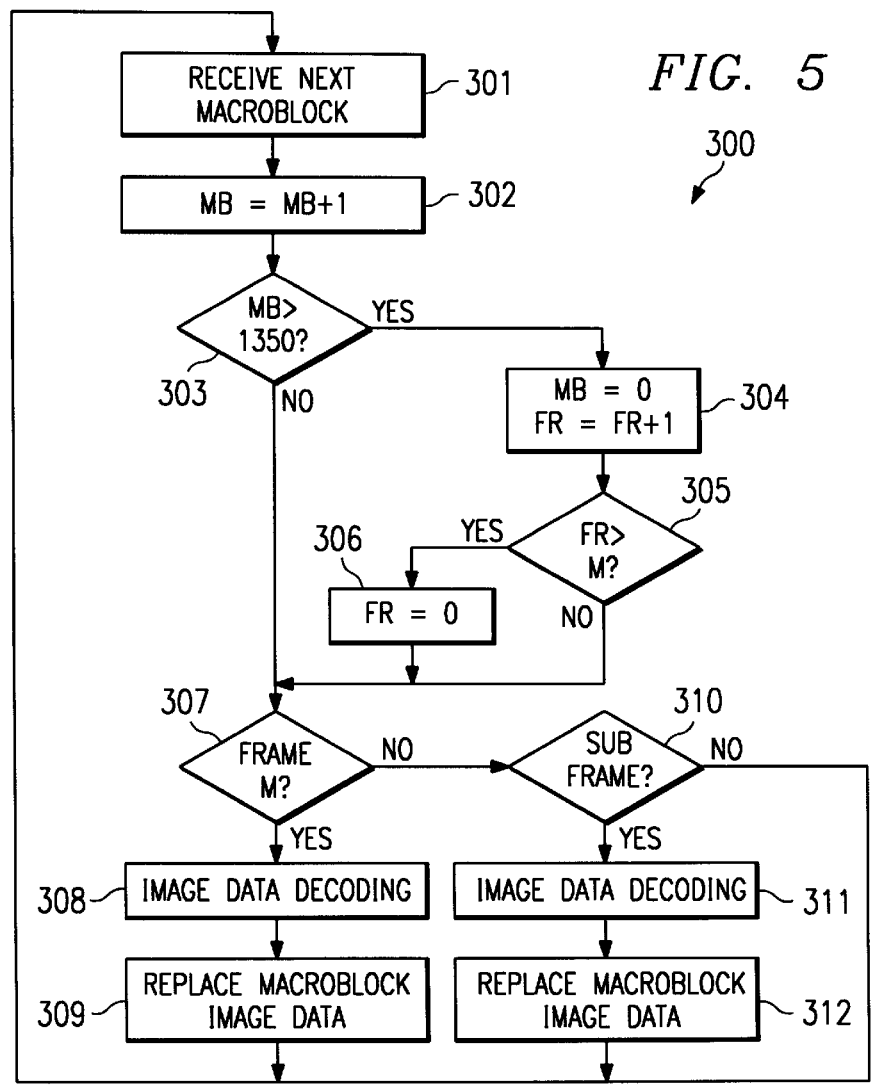
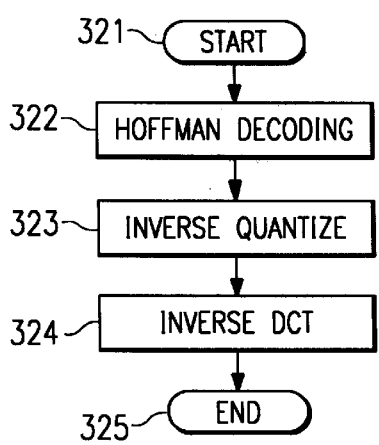
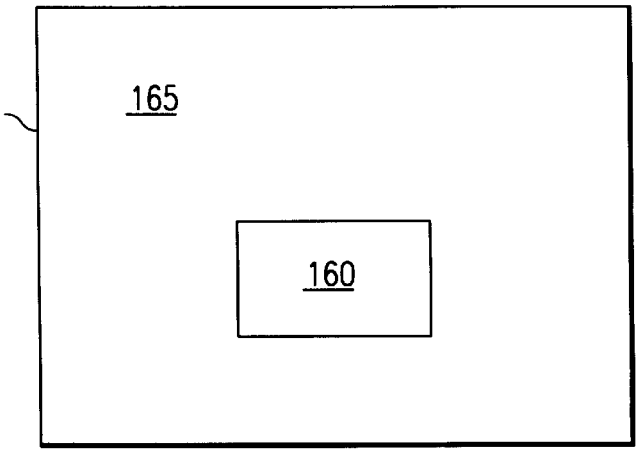

SUB-FRAME DECODER WITH AREA DEPENDENT UPDATE RATE FOR DIGITAL CAMCORDER TRANSMISSION STANDARD

This application claims priority under 35 USC 119(e) (1) of the provisional application No. 60/030,995, filed Nov. 15, 1996.

TECHNICAL FIELD OF THE INVENTION

The technical field of this invention is encoded video image decoding and especially software only decoding on a personal computer.

BACKGROUND OF THE INVENTION

Digital video camcorders are now available as commercial products. These digital camcorders produce digital video images which may be digitally manipulated and displayed. Personal computers are built for manipulating and storing digital data. Current standards for video camcorder data transmission require substantial amounts of hardware for image decompression when used in conjunction with a general purpose personal computer. The expense of this required hardware limits the number of applications where coupling a digital camcorder to a personal computer is economically feasible. Therefore there is a need in the art for a technique enabling software only decoding of encoded digital images is useful.

SUMMARY OF THE INVENTION

This invention is a method of decoding a stream of video image data transmitted as independent image frames consisting of plural marcoblocks transmitted in a nonsequential order. The method defines a sub-frame corresponding to a proper subset of the full frame. The method determines if a currently received macroblock is within the sub-frame. The method decodes the sub-frame. The sub-frame may be decoded at less than or equal to the frame rate of the video image data.

In the preferred embodiment the video image data is transmitted in plural macroblocks and the sub-frame consists of whole macroblocks. A table has one entry for each macroblock. The table stores a transmission order within the video frame for the corresponding macroblock. The sub-frame is defined by selecting a plurality of contiguous macroblocks. The method determine if a current macroblock is within the sub-frame by reading the table to see if the currently received macroblock has a transmission order entry corresponding to the sub-frame.

In the preferred embodiment each macroblock consists of a plurality of contiguous blocks. Each macroblock includes luminance data for any included blocks and chrominance data for the macroblock as a whole. The method optionally decodes the luminance data for each included block and ignores the chrominance data. Each macroblock includes plural data groups. The blocks are represented by data of differing lengths. If the data corresponding to a block does not fill a data group allocated to that block, the data is marked by an end of data marker. The method decodes the sub-frame employing only data prior to and end of data marker or an end of the data group, and ignores data following an end of data marker. The method may also decode a full frame of video image data at a full frame decode rate less than the sub-frame decode rate.

The method preferably employs a digital camcorder to generate the stream of video image data. This is transmitted to a personal computer, preferably a notebook computer, for decoding and display.

BRIEF DESCRIPTION OF THE DRAWINGS

These and other aspects of this invention are illustrated in the drawings, in which:

FIG. 3 illustrates an example of five superblocks of a single video frame from which five macroblocks are selected in the encoding sequence of the prior art SD format;

FIG. 4 illustrates the encoding of the five macroblocks selected from the five superblocks illustrated in FIG. 3;

FIG. 5 illustrates in flow chart form the decoding of video data in accordance with this invention;

FIG. 6 illustrates in flow chart form the steps of the data decoding blocks of FIG. 5; and FIG. 7 illustrates a video frame showing the areas decoded at differing rates.

DETAILED DESCRIPTION OF PREFERRED EMBODIMENTS

Figure 1:
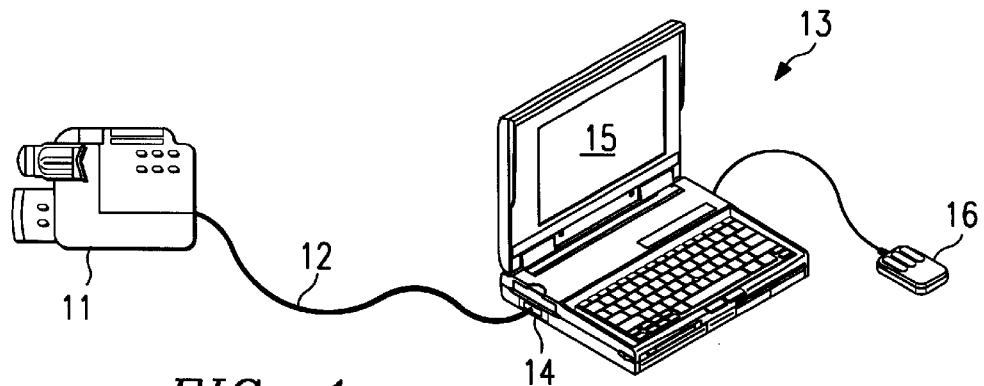
FIG. 1 illustrates a camcorder and a notebook computer connected in the manner of this invention.

FIG. 1 illustrates the system contemplated in a preferred embodiment of this invention. Note that FIG. 1 illustrates a notebook computer according to the preferred embodiment, but this invention may be practiced with any personal computer. A digital camcorder 11 forms a digital image. This digital image is compressed according to a digital compression standard known as SD format. This compressed digital image is recorded on a digital tape in a digital tape drive internal to digital camcorder 11. The compressed digital image is also transmitted via cable 12 in an electrical interface known as IEEE 1394. Cable 12 connects to an IEEE 1394 interface card 14 preferably formed as a PCM-CIA card in computer 13. This IEEE 1394 serves as only a convenient electrical interface and other types of data links may be used. In accordance with the preferred embodiment, computer 13 employs software to decode the compressed digital image data transmitted via cable 12 from digital camcorder 11. Computer 13 may display the decoded digital image data on viewing screen 15. This image display may occupy the entire viewing screen 15 or may occupy only a window within viewing screen 15.

The digital data transmitted by digital camcorder 11 is encoded in a format known as SD format. In the SD format each video frame is divided into an array of 720 horizontal pixels and 480 vertical pixels. This array of 720 by 480 pixels is grouped into blocks consisting of 8 by 8 arrays of pixels. The frame is thus 90 blocks wide in the horizontal and 60 blocks high in the vertical. These blocks are grouped into macroblocks. Each macroblock consists of four adjacent blocks. Most macroblocks consist of four horizontally adjacent blocks. Some of the macroblocks consist of four blocks disposed in a square. Each horizontal line of the frame encompasses 18 4-by-1 macroblocks 9 2-by-2 macroblocks. Most vertical stripes encompass 60 4-by-1 macroblocks. Some vertical stripes encompass 20 2-by-2 macroblocks. These macroblocks are in turn grouped into superblocks. Each superblock includes 27 macroblocks. The superblocks have three different shapes, which mesh to fill the frame. There are 50 superblocks in each frame.

Figure 2:
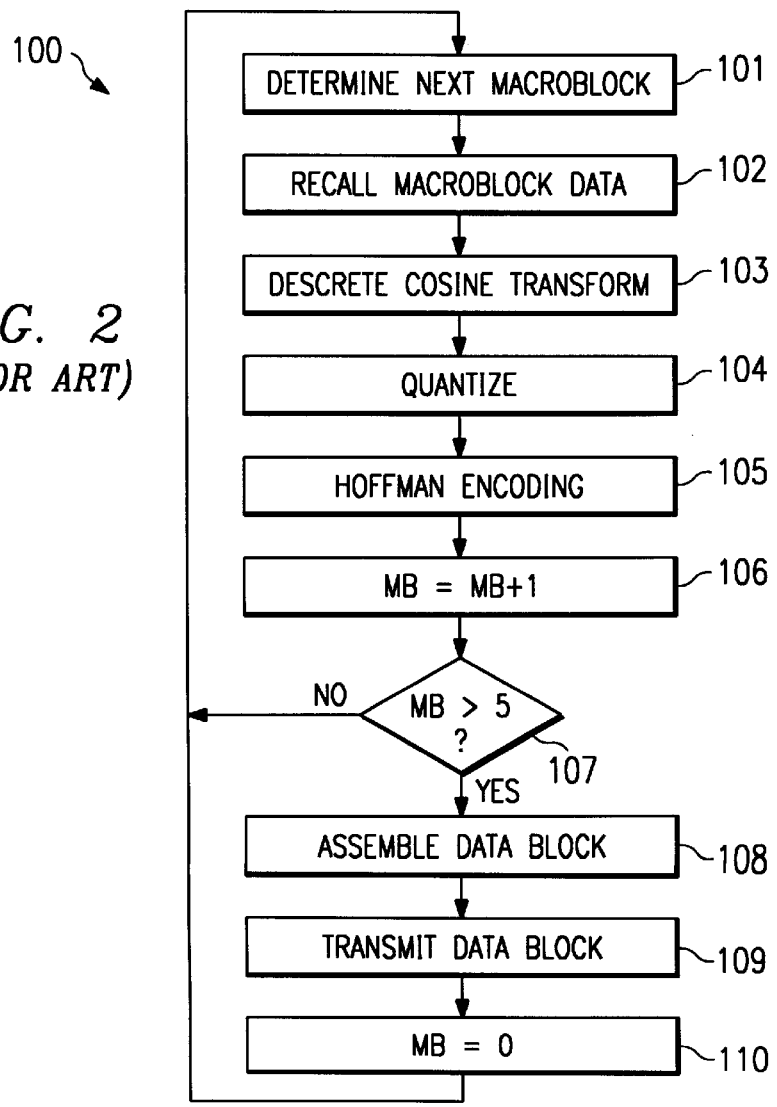
FIG. 2 illustrates in flow chart form the encoding of video data in the prior art SD format.

FIG. 2 illustrates flow chart 100 of the encoding sequence according to the prior art SD format. This encoding serves a data compression function by reducing the amount of data to be transmitted. This data compression function results in a minimal loss of image quality. The encoding process is described in terms of discrete steps for ease of description. Flow chart 100 begins with the video image captured by the camera part of camcorder 11 stored in a frame buffer in a known order. This image data is in the form of a data word corresponding to each of the 720 by 480 pixels of the image. The encoding process first determines which macroblock of data is next to be transmitted (block 101). The SD format transmits each frame individually without interframe interpolation or motion estimation. Thus each transmitted frame includes all the data needed to view that frame and any sub-frame. The SD format transmits data of macroblocks in a fixed sequence of nonadjacent macroblocks. A part of this sequence is illustrated in FIG. 3. FIG. 3 illustrates video image 150. The data corresponding to a first macroblock of a first superblock 151 is transmitted, then data corresponding to a first macroblock in a second superblock 152, then data corresponding to a first macroblock in a third superblock 153, then data corresponding to a first macroblock in a fourth superblock 154, followed by data corresponding to a first macroblock in a fifth superblock 155. This sequence then repeats with respect to a second macroblock of each of the first to fifth superblocks. Next the sequence transmits data corresponding to a third macroblock of each of the first to fifth superblocks. This continues until data corresponding to all 27 macroblocks of the first to fifth superblocks have been transmitted. The process then repeats with respect to the sixth to tenth superblocks, the eleventh to fifteenth superblocks and so forth, until data of all the macroblocks of all 50 superblocks have been transmitted. This transmission protocol is aimed at providing better quality in noisy transmission channels. Any noise will be more or less evenly distributed throughout the frame. Thus noise will not result in large degradations of a small region but a small degradation of the entire picture. Though the order of transmission of macroblocks is nonsequential, it is a fixed order. Thus each macroblock has a known macroblock next in the transmission sequence.

The encoding process next recalls from the frame buffer the image data corresponding to the next macroblock (block 102). This image data is subjected to a discrete cosine transform (block 103). As known in the art, the discrete cosine transform converts the data from the spatial domain into the spatial frequency domain. The discrete cosine transform is applied to the video image in blocks. Next, the data is quantized by coding the data into predetermined quantized bins (block 104). The quantized data is then Huffman encoded (block 105). Huffman encodes most frequently occurring data with shorter data words. Less frequently occurring data words are encoded with longer data words. Because of this Huffman encoding, the amount of data transmitted for similar sized data blocks vary depending on the nature of the image of that block.

Following Huffman encoding, a macroblock counter MB is incremented (block 106). The encoding process determines whether the macroblock counter MB is greater than 5 (decision block 107). If this macroblock counter MB is greater than 5, then the encoding process assembles a data block (block 108). Each data block is as illustrated in FIG. 4. Data for five macroblocks is transmitted as a group. One of these five macroblocks comes from each of the five superblocks as described above. Each macroblock is transmitted in a predetermined data sequence illustrated in FIG. 4. There are four 14 byte data groups corresponding to luminance data Y from the four blocks of the macroblock. Following the four luminance data groups are two chrominance data groups U and V of 10 bytes each. Each chrominance data group includes data for all four blocks of the macroblock. This limitation of the amount of chrominance data encoded takes advantage of the known perception character that people are less sensitive to changes in chrominance that changes in luminance. This same set of four 14 byte luminance data groups followed by two 10 byte chrominance data groups repeats for each macroblock in the set of five superblocks.

Since the data is Huffman encoded, the data lengths are not known. The 14 bytes allocated to each luminance data group and the 10 bytes allocated to each chrominance data group is not guaranteed to be enough in all cases. Blocks that are busy, such as stripes or checkerboard boxes, will require more data than plain or unfeatured blocks. The SD format includes an end of data marker 215 that marks the end of data of the corresponding block. Data corresponding to some of the blocks within the set of 5 superblocks will underflow the data bytes allocated. In those data blocks which underflow their allocated 14 bytes, the end of data is marked by an end of data marker 215 equal to "0110". In those data groups where the data overflows the allocated data size, this overflow data is placed in the first data group having unused space. As illustrated in FIG. 4, luminance data $Y_{13}$ overflows into area 211 of the 14 bytes allocates to luminance data $Y_{11}$. If this data ends before the end of the data block, this data end is marked by another end of data marker 215. The unused space within the first data group having unused space may be insufficient for the overflow. This is illustrated in FIG. 4 where overflow data from luminance data $Y_{14}$ fills area 213 of luminance data $Y_{11}$. If this occurs, then the remaining overflow data is placed in the next data group having unused space. In this case the remaining data of luminance data $Y_{14}$ is placed in area 217 of luminance data $Y_{13}$. This process is used by all overflowing data blocks. Note that FIG. 4 only illustrates data overflow within data 210 allocated to the first macroblock. Illustration of shifting overflow data into data 220, 230, 240 and 250 allocated to the other four macroblocks is omitted for clarity of illustration. However, overflow data may be placed within unused data space at any location within data 210, 220, 230, 240 and 250. If there is no remaining unused space for overflow data from a particular data group, this data is truncated. Such truncation will be unlikely because the macroblocks are distributed about the frame. Therefore it is unlikely that overflow will occur for all of the macroblocks within the same set of five macroblocks. Thus, no overflow data is relocated outside the set of 5 macroblocks. Note that a particular data group may include no end of data marker, one end of data marker or more than one end of data marker.

Following assembly, the data block is transmitted (block 109). In the preferred embodiment the data is transmitted via IEEE 1394 cable 12. The SD format is also applicable to data storage, such as storage in the digital tape in the internal digital tape drive within digital camcorder 11. Note that FIG. 2 does not imply any delay between data block transmissions. It is assumed that data blocks as illustrated in FIG. 4 are transmitted continuously without interruption. Suitable buffering as known in the prior art may be used for this purpose. Following data transmission, the macroblock counter MB is reset to zero (block 110). This resets the process to accumulating data for the next data block as illustrated in FIG. 4.

Regardless of whether the newly encoded macroblock is assembled and transmitted, the encoding process returns to block 101. This determines the next macroblock to be encoded. Note that frames are continuous, therefore the next macroblock to be encoded following completion of a video frame is the first macroblock of the next frame. The process of changing to the next frame may require suitable buffering as known in the art.

The goal of viewing the picture from digital camcorder on a personal computer has a serious problem. The data processing capacity of a personal computer having a microprocessor such as a Pentium operating at 133 MHz is insufficient to decode that digital data stream for the entire frame in real time. The personal computer may operate at some reduced frame rate for the entire frame. The data processing capability of a 133 MHz Pentium microprocessor without hardware assistance can decode only about one entire frame in three seconds. This rate may be too slow to be useful in some applications. The second solution is to reduce the amount of data to be decoded by limiting the decoding to a sub-frame of the video image. The size of the sub-frame determines amount of data to be decoded.

There is a problem with this second solution. It should be immediately apparent that in the SD format data of adjacent macroblocks is not transmitted sequentially. The data for the macroblocks corresponding any sub-frame are disbursed throughout the frame data. The SD format does not contemplate decoding sub-frames. Though it may be difficult, since the order of transmission of data corresponding to the macroblocks within the frame is fixed, it should be possible to identify only the data of macroblocks within an arbitrary sub-frame. Even after solving this problem, decoding of only a sub-frame may not give the user enough information about the complete frame. Based upon the capability of a personal computer with a 133 MHz Pentium microprocessor, it is believed possible to decode: a 120 by 96 pixel sub-frame at 10 frames per second; and a 180 by 120 pixel sub-frame at 1 frame per second. The sub-frame of the first option may be too small for the user to judge the activity of the video image. Likewise, the decoded frame rate of the sub-frame of the second option decoding of the second option may be too slow for the user to judge the activity of the video image.

A third option is implemented in the preferred embodiment of this invention. A selected sub-frame of each video frame is decoded at a high rate and the remainder of the frame is decoded at a low rate. Thus the user may have a better understanding of the entire frame while following a more frequently changing sub-frame. This technique is advantageous for video conferencing. In video conferencing applications there is generally a unchanging background and a more rapidly changing foreground around the video conferencing user. Proper selection of the decoding rates and sub-frame dimensions would enable a match to the maximum decoding rate of the particular personal computer.

The decoding process of the preferred embodiment is illustrated as process 300 in FIG. 5. The decoding process is described in terms of discrete steps for ease of description. The process begins with receiving the next transmitted macroblock (block 301). The decoding process then increments a macroblock counter MB (block 302). The decoding process then checks to determine if the macroblock counter exceeds 1350 (decision block 303). Because the number of macroblocks per frame is 1350, this counter serves to detect frame boundaries. If the macroblock counter MB exceeds 1350, then the macroblock counter MB is reset to zero and a frame counter FR is incremented (block 304). The decoding process next tests to determine if the frame counter FR exceeds a predetermined number M (decision block 305). In accordance with the preferred embodiment a full frame decode takes place every M frames. If the frame counter FR exceeds M, then the frame counter is reset to zero (block 306).

The decoding process next determines if the frame counter FR equals the predetermined number M (decision block 307). As noted above, the preferred performs a full frame decode every M frames. If this is the case, then the image data is decoded (block 308). This process, which is essentially the reverse of the encoding process described in conjunction with FIG. 2, is illustrated in FIG. 6. After starting at start block 321, the data is Huffman decoded (block 322). This involves converting the data from the coded form in which most used data is encoded as shorter data word into their normal format. There are a number of options in this process which may be employed to reduce data processing. These options will be discussed below. Next the data is inverse quantized (block 323). This converts each value into a central value for the particular quantity bit. The data is then subjected to an inverse discrete cosine transform (block 324) which is a known process. Following the inverse discrete cosine transform, the decoding process is complete at end block 325. The decoded data is then stored in a frame buffer in an appropriate location corresponding to the decoded macroblock (block 309). As noted above, the macroblocks are transmitted in a fixed and scrambled order. The current state of the macroblock counter MB unambiguously indicates the position of the macroblock within the video frame. Following this replacement in the video frame, the decoding process returns to receive the next macroblock (block 301).

If the frame counter FR does not equal the predetermined frame count M, then a full frame decode is not performed. The decoding process next determines if the macroblock is within the designated sub-frame (decision block 310). As previously mentioned, the macroblock counter MB unambiguously indicates the position of the macroblock within the frame. Thus the macroblock counter may be used to determine if the current macroblock is within the designated sub-frame. In the preferred embodiment the decoding software includes a table having one entry corresponding to each macroblock. Each entry in this table holds the macroblock counter number of the transmission order of that macroblock within the video frame. The sub-frame is defined in terms of included macroblocks. By limiting the sub-frame to macroblock boundaries, this table enables determination of whether the currently received macroblock is within the sub-frame. As illustrated in FIG. 7, a portion 160 of the video frame 150 is decoded at a higher rate than the remaining portion 160 of the video frame 150. The sub-frame 160 may be identified by any convenient means, such as designation of the pixel boundaries. If the macroblock is not within the sub-frame, the current macroblock is ignored, and the decoding process returns to receive the next macroblock (block 301). If the macroblock is within the sub-frame, then the macroblock data is decoded (block 311). This process may be identical to the decoding of block 308 illustrated in detail in FIG. 6. The decoded data is then stored in the frame buffer at a location corresponding to the macroblock counter MB (block 312). Following this replacement in the video frame, the decoding process returns to receive the next macroblock (block 301). Note that some parts of process 300, such as the image data decoding of blocks 308 and 311, must take place almost continuously to take advantage of the processing capacity of computer 13. Thus computer 13 would not be idle when the incoming data is neither within a fully decoded frame nor within the sub-frame. Those skilled in the art of real time processing would understand how to employ interrupts or polling to achieve this purpose.

As mentioned above, there are various decoding compromises which can be made to reduce the computational requirements. Process 300 contemplated that the sub-frame boundaries would be on macroblock boundaries. It is technically feasible to decode less than all the blocks within a macroblock such as illustrated in FIG. 4. This process would involve using the luminance data corresponding to the blocks within the sub-frame together with the chrominance data U and V for the whole macroblock. Luminance data corresponding to other blocks within the macroblock would not be used. However, the additional data processing complexity required to decode partial macroblocks may be too great to reach the desired decoding rate goals. Accordingly, decoding for the sub-frame may be limited to whole macroblocks.

It would be advantageous to save computational resources by ignoring the overflow data chaining illustrated in FIG. 4. In this case data within each data group following an end of data marker 215 would be ignored. Thus Huffman decoding would stop up reaching an end of data marker 215 or at the end of the data size allocated (14 bytes for luminance components and 10 bytes for chrominance components), whichever occurs first. Because the data is encoded in an order from the least spatial frequencies to the greatest spatial frequencies, this would result is some degradation of the fine detail of the image. However, this degradation is believed acceptable in this application. Note that ignoring the overflow data chaining makes the four data groups 210, 220, 230, 240 and 250 independent. This permits the decoding process to ignore data groups not originally allocated to the desired macroblock. Note that this technique may be used for both the full frame decoding and for the sub-frame decoding.

A further reduction in computational requirements may be achieved by ignoring the chrominance components. Using only the luminance data groups would result in decoding a gray scale image. This would reduce the amount of data to be decoded by about 25%. In some applications this reduction in data processing requirements in exchange for a gray scale image may be advantageous. As in the case of ignoring the data overflow chaining, this technique may be used for both the full frame decoding and for the sub-frame decoding. It is also possible to employ this technique for one portion of the frame and not the other. The full frame decoding may ignore the chrominance data and produce a gray scale image while the sub-frame decoding may produce a full color image using the corresponding chrominance data.

The rate of decoding the sub-frame data need not be the frame rate of the transmitted video image. As hinted at above, the computational capacity of a personal computer having a 133 MHz Pentium microprocessor may be insufficient to decode a sub-frame of useful size at the full frame rate. A sub-frame decode rate of greater than one sub-frame per second, or more preferably between 5 and 10 sub-frames per second, would still be useful in video conferencing applications. A reasonable compromise using this hardware would be a full frame every three seconds or more and a sub-frame of 120 by 96 pixels (or 4 by 8 macroblocks) at 5 to 10 per second. This slower rate of sub-frame decoding can be enabled by checking the frame counter FR prior to detecting whether the current macroblock is within the designated sub-frame. The sub-frame rate may be synchronous with the full frame rate or asynchronous with the full frame rate.

A yet additional manner to reduce the computational requirements is to omit decoding the full frame even at a low rate. This further reduction in the computation requirements may enable the personal computer to decode the sub-frame at a higher rate, perhaps up to the full frame rate. Alternatively, omitting decoding the full frame may be used to enable the personal computer to decode a larger sub-frame than otherwise possible.

What is claimed is:

1. A method of decoding a stream of video image data transmitted as independent image frames at a predetermined rate, the stream of video image data consisting of plural marcoblocks transmitted in a nonsequential order, comprising the steps of:

defining a sub-frame corresponding to a proper subset of said full frame;

determining if a currently received macroblock is within said sub-frame; and decoding said sub-frame.

2. The method of claim 1, wherein:

said step of decoding said sub-frame takes place at a sub-frame decode rate equal to said predetermined rate.

3. The method of claim 1, wherein:

said step of decoding said sub-frame takes place at a sub-frame decode rate less than said predetermined rate.

4. The method of claim 1, wherein:

said sub-frame consists of whole macroblocks.

5. The method of claim 4, further comprising:

forming a table having one entry corresponding to each macroblock and storing within said each entry a transmission order within the video frame for said corresponding macroblock;

said step of defining said sub-frame includes selecting a plurality of contiguous macroblocks; and said step of determining if said currently received macroblock is within said sub-frame includes determining if said currently received macroblock has a transmission order entry in said table corresponding to one of said contiguous macroblocks.

6. The method of claim 1, wherein each macroblock consists of a plurality of contiguous blocks and wherein:

said sub-frame consists of whole macroblocks.

7. The method of claim 6, wherein each macroblock includes luminance data for each included block and chrominance data for the macroblock as a whole, the method wherein:

said step of decoding said sub-frame includes decoding said luminance data for each included block of each macroblock and ignoring said chrominance data.

8. The method of claim 6, wherein each macroblock includes plural data groups at least one corresponding to each block, said blocks represented by data of differing lengths whereby if the data corresponding to a block does not fill a data group allocated to that block the data is marked by an end of data marker separating that data from free data space until the end of the data group and if the data corresponding to a block overflows a data group allocated to that block the overflow data is placed in a first data group within said group of marcoblocks having free data space, the method wherein:

said step of decoding said sub-frame includes decoding data groups allocated to blocks employing only data prior to the first appearing of an end of data marker or an end of the data group, and ignoring data following an end of data marker.

9. The method of claim 1, further comprising:

decoding a full frame of video image data at a full frame decode rate less than said sub-frame decode rate.

10. A method of operating a programmable computer for decoding a stream of video image data transmitted as independent image frames at a predetermined rate, the stream of video image data consisting of plural marcoblocks transmitted in a nonsequential order, comprising the steps of:

programming the computer to define a sub-frame corresponding to a proper subset of said full frame;

programming the computer to determine if a currently received macroblock is within said sub-frame;

programming the computer to decode said sub-frame; and programming the computer to display said decoded sub-frame.

11. The method of claim 10, wherein:

said step of programming the computer to decode said sub-frame decodes the sub-frame at a sub-frame decode rate equal to said predetermined rate.

12. The method of claim 10, wherein:

said step of programming the computer to decode said sub-frame decodes the sub-frame at a sub-frame decode rate less than said predetermined rate.

13. The method of claim 10, wherein:

said sub-frame consists of whole macroblocks.

14. The method of claim 13, further comprising:

programming the computer to form a table having one entry corresponding to each macroblock and storing within each entry a transmission order within the video frame for said corresponding macroblock;

said step of programming the computer to define said sub-frame includes selecting a plurality of contiguous macroblocks; and said step of programming the computer to determine if said currently received macroblock is within said sub-frame includes determining if said currently received macroblock has a transmission order entry in said table corresponding to one of said contiguous macroblocks.

15. The method of claim 10, wherein each macroblock consists of a plurality of contiguous blocks and wherein:

said sub-frame consists of whole macroblocks.

16. The method of claim 15, wherein each macroblock includes luminance data for each included block and chrominance data for the macroblock as a whole, the method wherein:

said step of programming the computer to decode said sub-frame includes programming the computer to decode said luminance data for each included block of each macroblock and ignore said chrominance data.

17. The method of claim 15, wherein each macroblock includes plural data groups at least one corresponding to each block, said blocks represented by data of differing lengths whereby if the data corresponding to a block does not fill a data group allocated to that block the data is marked by an end of data marker separating that data from free data space until the end of the data group and if the data corresponding to a block overflows a data group allocated to that block the overflow data is placed in a first data group within said group of marcoblocks having free data space, the method wherein:

said step of programming the computer to decode said sub-frame includes programming the computer to decode data groups allocated to blocks employing only data prior to the first appearing of an end of data marker or an end of the data group, and ignore data following an end of data marker.

18. The method of claim 10, further comprising:

programming the computer to decode a full frame of video image data at a full frame decode rate less than said sub-frame decode rate; and programming the computer to display said decoded full frame.

19. A method of decoding a stream of video image data transmitted as independent image frames at a predetermined rate comprising the steps of:

decoding a full frame of image data at a full frame decode rate much less than said predetermined rate; and decoding a sub-frame corresponding to a proper subset of said full frame at a sub-frame decode rate higher than said full frame decode rate.

20. The method of claim 19, wherein:

said sub-frame decode rate equals said predetermined rate.

21. The method of claim 19, wherein:

said sub-frame decode rate is less than said predetermined rate.

22. The method of claim 19, wherein the stream of video image data consists of plural marcoblocks transmitted in a nonsequential order, said method wherein:

said step of decoding said sub-frame includes determining if a received macroblock includes data within said sub-frame.

23. The method of claim 22, wherein:

said sub-frame consists of whole macroblocks.

24. The method of claim 22, wherein the macroblocks each include data corresponding to plural contiguous blocks, said method wherein:

said sub-frame consists of whole blocks.

25. The method of claim 24, wherein each macroblock includes luminance data for each included block and chrominance data for the macroblock as a whole, the method wherein:

said step of decoding said sub-frame includes decoding said luminance data for each included block of each macroblock and ignoring said chrominance data.

26. The method of claim 24, each macroblock having plural data groups corresponding to each block, said blocks represented by data of differing lengths whereby if the data corresponding to a block does not fill the data group allocated to that block the data is marked by an end of data marker separating that data from free data space until the end of the data group and if the data corresponding to a block overflows the data group allocated to that block the overflow data is placed in a first data group within said group of marcoblocks having free data space, the method wherein:

said step of decoding said sub-frame includes decoding data groups allocated to blocks employing only data prior to the first appearing of an end of data marker or an end of the data group and ignoring data following an end of data marker.

27. The method of claim 19, wherein the stream of video image data consists of plural marcoblocks, each macroblock including luminance data for each included block and chrominance data for the macroblock as a whole, the method wherein:

said step of decoding said full frame includes decoding said luminance data for each included block of each macroblock and ignoring said chrominance data.

28. The method of claim 19, wherein the stream of video image data consists of plural marcoblocks transmitted in plural groups of noncontiguous macroblocks, each macroblock including data corresponding to plural contiguous blocks, each macroblock having plural data groups corresponding to each block, said blocks represented by data of differing lengths whereby if the data corresponding to a block does not fill the data group allocated to that block the data is marked by an end of data marker separating that data from free data space until the end of the data group and if the data corresponding to a block overflows the data group allocated to that block the overflow data is placed in a first data group within said group of marcoblocks having free data space, the method wherein:

said step of decoding said full frame includes decoding data groups allocated to blocks employing only data prior to the first appearing of an end of data marker or an end of the data group and ignoring data following an end of data marker.

29. The method of claim 19, wherein the stream of video image data consists of plural macroblocks, each macroblock including luminance data for each included block and chrominance data for the macroblock as a whole, the method wherein:

said step of decoding said sub-frame includes decoding said luminance data for each included block of each macroblock and ignoring said chrominance data.

30. The method of claim 19, wherein the stream of video image data consists of plural marcoblocks transmitted in plural groups of noncontiguous macroblocks, each macroblock including data corresponding to plural contiguous blocks, each macroblock having plural data groups corresponding to each block, said blocks represented by data of differing lengths whereby if the data corresponding to a block does not fill the data group allocated to that block the data is marked by an end of data marker separating that data from free data space until the end of the data group and if the data corresponding to a block overflows the data group allocated to that block the overflow data is placed in a first data group within said group of marcoblocks having free data space, the method wherein:

said step of decoding said sub-frame includes decoding data groups allocated to blocks employing only data prior to the first appearing of an end of data marker or an end of the data group and ignoring data following an end of data marker.

* * * * *